(12) United States Patent
Perlberg et al.

(10) Patent No.: US 6,223,693 B1
(45) Date of Patent: May 1, 2001

(54) SOFT RAWHIDE ARTICLE AND METHOD

(75) Inventors: William Perlberg, Franklin Lakes, NJ (US); David S. Schwartz, Brooklyn, NY (US); Richard W. Glass, Coopersburg, PA (US)

(73) Assignee: Hartz Mountain Corporation, Secaucus, NJ (US)

( * ) Notice: Subject to any disclaimer, the term of this patent is extended or adjusted under 35 U.S.C. 154(b) by 0 days.

(21) Appl. No.: 09/210,223

(22) Filed: Dec. 11, 1998

Related U.S. Application Data

(60) Provisional application No. 60/070,018, filed on Dec. 30, 1997.

(51) Int. Cl.[7] .................................................. A01K 29/00
(52) U.S. Cl. ........................................... 119/707; 119/710
(58) Field of Search ................................... 119/707, 709, 119/710

(56) References Cited

U.S. PATENT DOCUMENTS

| | | | | |
|---|---|---|---|---|
| 2,988,045 | * | 6/1961 | Fisher | 119/709 |
| 3,123,047 | * | 3/1964 | Fisher | 119/709 |
| 5,339,771 | * | 8/1994 | Axelrod | 119/710 |
| 5,419,283 | * | 5/1995 | Leo | 119/709 |
| 5,476,069 | * | 12/1995 | Axelrod | 119/709 |
| 5,673,653 | * | 10/1997 | Sherrill | 119/709 |
| 5,832,877 | * | 11/1998 | Markham | 119/710 |

* cited by examiner

Primary Examiner—Peter M. Poon
Assistant Examiner—Elizabeth Shaw
(74) Attorney, Agent, or Firm—Stroock & Stroock & Lavan LLP

(57) ABSTRACT

A soft rawhide product is made by soaking raw animal hides in a humectant or combining chopped rawhide particles with the humectant and a soft edible binder. The humectant is taken up by the rawhide and provides a soft rawhide product even after the product is permitted to dry or is exposed to the air for long periods of time. The presence of the humectant and binder not only contribute to the softness of the rawhide product, but permits an increase in the moisture content and/or flexibility of the rawhide while still maintaining an acceptably low water activity. An additional benefit is an increased ability to import colors, flavors, scents, nutritional material or drugs into the edible chew toy product.

42 Claims, 2 Drawing Sheets

SOFT RAWHIDE ARTICLE AND METHOD

CROSS REFERENCE TO RELATED APPLICATIONS

This application claims priority to provisional application Ser. No. 60/070,018, filed Dec. 30, 1997, the contents of which are incorporated herein by reference.

BACKGROUND OF THE INVENTION

This invention relates generally to soft rawhide and a method of forming soft rawhide and more particularly to an edible chew toy made of chopped rawhide, for pets, such as dogs.

Rawhide products originate from the natural skins of animals such as cows. Other animal skins, such as pig, goat and water buffalo skins can also be used. To form rawhide, a cow or other animal hide is split. The top grain is generally tanned and formed into leather products. The bottom half of the hide is generally kept in its natural "raw" state. Hides in such natural, untanned state, are generally referred to as rawhide. One common use for rawhide is the production of chemicals such as gelatin. Another important use for rawhide is the manufacture of edible chew toys for pets, such as dogs.

One characteristic of a pet chew toy is that it should be nontoxic. Thus, rawhide chew toys should not include dangerous substances such as formaldehyde and other preservatives which prevent the rawhide from becoming contaminated by bacteria, microbes, maggots and the like. A rawhide chew toy also cannot contain many of the processing chemicals commonly used in the tanning of leather which make the leather soft. Not only could these be unhealthy to a dog, but training a dog to chew on a toy which smells like leather could fool a dog into thinking that it is acceptable to chew on a shoe or leather handbag.

In order to make rawhide chew toys acceptably resistant to contamination, rawhide chew toys are commonly sold in a dehydrated state. An acceptably low moisture content can lead to a safe or stable water activity. Thus, if the water activity of the rawhide article is too high, there is a possibility that the chew toy will be contaminated by mold, bacteria and the like or otherwise become unsanitary and potentially harmful for the pet. Thus, many rawhide chew toy products contain less than about 13% moisture in order to have an acceptable water activity below about 0.75.

Water activity is defined by Encyclopedia of Food Science, AVI Publishing as the ratio of the vapor pressure exerted by the water contained in the product to the vapor pressure of pure water at the same temperature. The lower the water activity of a product, the less susceptible that product is to the growth of bacterial, fungal and yeast organisms. Fruits, bread and meat all have water activities above 0.95. In contrast, crackers, cereal and sugar can have a water activity as low as 0.1.

Conventional rawhide chew toys have drawbacks. When made with acceptably low moisture, the product can be extremely hard and rigid. Thus, old dogs, small dogs or dogs with tooth problems are often unable to enjoy a conventional low moisture content, naturally hard, rigid, rawhide chew toy. Many dog owners also find conventional hard rawhide toys to be unpleasant to handle after a pet has been chewing the toy.

One form of a rawhide chew toy is made from chopped rawhide, which is subsequently formed into a desirable shape, such as that of a bone. However, conventional chopped rawhide chew toys suffer from drawbacks of conventional rawhide products, such as undesirable rigidity.

Accordingly, it is desirable to provide an improved rawhide product which is soft, sanitary, safe for a pet to eat and which can be formed into a desirable shape.

SUMMARY OF THE INVENTION

Generally speaking, in accordance with the invention, a soft rawhide product and method of forming the soft rawhide product are provided. Soft rawhide products in accordance with the invention can be made by soaking the untanned skins of animals in a humectant, such as a polyol, such as propylene glycol, glycerin, sorbitol or mannitol. The humectant is taken up by the rawhide and provides a soft rawhide product which stays soft, even after the product is permitted to dry or is exposed to the air for long periods of time. The presence of the humectant not only contributes to the softness of the rawhide product, but permits an increase in the moisture content of the rawhide while still maintaining an acceptably low water activity, such as below about 0.85, advantageously below about 0.75 and even below 0.7. In addition, other solutes, such as sucrose may be used to keep water activity at an acceptably low level. An additional benefit of the humectant is an increased ability to import colors, flavors, scents, nutritional supplements or drugs into the chew toy product.

In another aspect of the invention, one or more humectants, such as glycerin, propylene glycol, sorbitol or mannitol; water; and edible binders such as gelatin are combined with chopped bits of rawhide, such as what is commonly referred to as rawhide flour and then formed by a method such as extrusion or molding into a desired shape. In another aspect of the invention, a sheet of hard or soft rawhide (or any other suitable edible material) can be combined with a chopped rawhide shape. For example, a hard or soft rawhide sheet can be wrapped around a soft chopped rawhide center.

Accordingly, it is desirable to provide an improved rawhide product which overcomes inadequacies in the prior art.

Another object of the invention is to provide a soft rawhide product, which is both sanitary and edible.

Yet another object of the invention is to provide a method of making a soft rawhide product.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Soft rawhide, in accordance with preferred embodiments of the invention, can be formed by known methods for producing a conventional hard rawhide product by the inclusion of a softening ingredient, such as a humectant, into the rawhide during or after the processing procedure. As used herein, the term rawhide will encompass hides of not only cows, but also other animals, such as pigs, goats, water buffaloes and so forth. The humectant can be incorporated into the rawhide by dipping, coating, spraying and the like. Acceptable humectants include polyols, such as propylene glycol, glycerin, sorbitol or mannitol.

Various techniques for incorporating the humectant into the rawhide can be employed. The humectant, either alone or in combination with water or other materials can be combined with the rawhide product before or after the rawhide is subjected to a drying step. Alternatively, the moisture content of the rawhide can be increased prior to or after the exposure to the humectant. The humectant can be a single humectant or a combination of more than one humectant. Additionally, enhancing additives such as colors, flavors, scents, nutritional supplements and/or drugs can be combined with the humectant prior to its combination with the rawhide product and thereby incorporated into the soft rawhide final product.

In one preferred method of making soft rawhide products in accordance with the invention, cowhides are split and thoroughly washed and cleaned of bacteria. The hide is treated and processed in the same manner as for conventional rawhide chew toys, with materials such as detergents, water and anti-hair materials. The washed hides are then sanitized, such as by being tumbled in liquid hydrogen peroxide and then thoroughly rinsed with water. Excess water is then removed, such as by pressing the hides between the nip of two pinch rollers. At this point, the hides are relatively soft and flexible, but may contain as much as 75% absorbed water.

The soft, high moisture content, hides are then soaked in humectants such as glycerin or propylene glycol which can be in either pure form or in combination or in aqueous solution. Soaking times as little as one hour can be acceptable for certain applications, while other embodiments of the invention can employ soaking times of three to five hours, while still other embodiments of the invention utilize twenty-four hour and greater soaking times. In another embodiment of the invention, the rawhide is chopped or ground into particles, such as what is commonly known as rawhide flour and then combined with the humectant.

Figure 1:
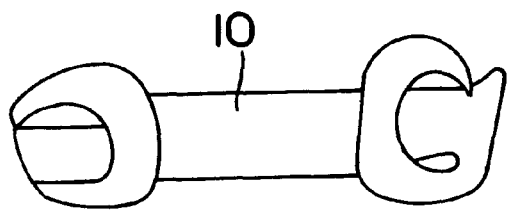
FIG. 1 is a perspective view of a pet chew toy formed from a sheet of soft rawhide in accordance with a preferred embodiment of the invention.

After being exposed to the humectant, the sheets of rawhide, which now contain water and humectant (e.g. propylene glycol and/or glycerin), are then wrung again, cut to size and formed into a desired shape or configuration. An optional chew toy shape of a bone 10 is shown in FIG. 1. Other optional shapes include, but are not limited to chips, rolls, bones and twists. The shaped rawhide sheets are then dried on a rack in a drying oven to drive off excess water at temperatures preferably in the range of about 90–140° F. If the drying temperature is too high, over drying can occur and the final product can become too hard.

Drying can take anywhere from several hours to three to four days, or even 10–14 days or more, depending on the size and shape of the product. For small chips, excess water can be driven off easily in view of their large surface area to volume ratio, and thus, drying time will be relatively small. For large bones, or large rolls, drying times must be longer so that moisture in the center thereof can be driven to the outer surface and evaporated. If drying proceeds too quickly, the outer surface of a thick product will become hardened and prevent moisture from the interior of the product from being driven off. The result can be a product having too much internal moisture, which can lead to sanitary problems.

It has been determined that a conventional rawhide product might require greater than 20–30% moisture to be in a soft state. However, such a product will have a water activity of over 0.85 (approximately 1.0) and will be poorly preserved and subject to microbial and fungal growth and will harden and become rigid upon drying. In contrast, rawhide products in accordance with the invention can be as soft as a conventional rawhide product having at least 20–30% moisture and have a water activity low enough to prevent microbial growth and remain safe and sanitary. For example, the water activity can be below 0.85 and even below 0.75 or 0.70. Soft rawhide sheet products in accordance with the invention can be formed with 10–40% polyol content and a moisture content as high as approximately 20% and above, while maintaining acceptable water activities of below 0.75, 0.70 and lower.

Certain chopped or extruded rawhide products on the market are also initially soft. However, these products, which are formed with bits of rawhide of generally less than ¼ inch in diameter, and generally smaller are pasted together. Thus, in addition to consuming the rawhide, a pet will also consume the material used to paste the pieces together. Moreover, such products will harden when exposed to air for relatively short periods of time. In contrast, a soft flexible rawhide product in accordance with one embodiment of the invention can be in the form of a continuous piece of rawhide having a surface area of over one square inch, over five square inches and even over one square foot, the limit being the size of the hide itself. In addition, in accordance with another embodiment of the invention, it is possible to form soft flexible chew toys from chopped or extruded soft rawhide. The rawhide can be combined with the humectant either before or after being chopped, extruded or formed into a selected shape and remain soft and flexible, even after being exposed to the air for over one week.

In one embodiment of the invention, water, glycerin (or an alternative humectant), gelatin (or another suitable binder) and optionally colors, flavors or scents are combined, mixed with optional heating to help dissolve some of the components, and then combined with chopped rawhide particles. The mixture is then formed into desired shapes, advantageously by extrusion, molding or other suitable methods, and various shapes of soft, sanitary rawhide articles can be obtained. In another embodiment of the invention, a hard or soft rawhide sheet can be wrapped around a soft chopped rawhide shape. A wide ratio of rawhide, humectant and binder which can provide a satisfactory product will be within the abilities of those of ordinary skill in the art.

The following is provided as a preferred example, with all percentages on a weight basis:

| Ingredient | Example | Optional Range |
| --- | --- | --- |
| Humectant (Glycerin) | 31.5% | 10–55% |
| Water | 10.5% | 4–20% |
| Binder (Gelatin) | 8.0% | 4–20% |
| Rawhide Flour | 50.0% | 25–65% |
| Color, Flavor, Scent, Preservative | As desired | |

In one non-limiting example, 25 kilos of water, 69 kilos of glycerin and 17.5 kilos of gelatin were combined in a mixing tank 51 of an apparatus 50. The mixture was heated to a temperature of 80° C. (A temperature of over 45° C., and less than about 100° C. is advantageous). The mixture was then combined with 10 kilos of chopped dry rawhide in mixer 52 and mixed. A sigma blade mixer operating at about 50 rpm is acceptable. This mixture was then fed to a cold forming extruder 53 and desired shapes were formed by extrusion. An example of an acceptable forming extruder is a four inch water cooled forming extruder with a continuous flight auger and a pin barrel, operating at about 77 rpm.

Figure 2:
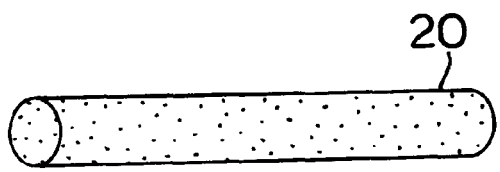
FIGS. 2 and 3 are soft rawhide chew toys formed from chopped rawhide, in accordance with preferred embodiments of the invention.
Figure 3:
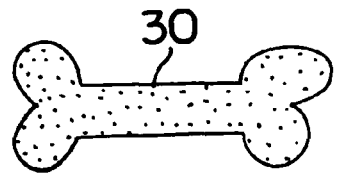

A conventional rawhide chew toy, in the shape of a bone 10 of FIG. 1, a log 20 of FIG. 2 or a bone 30 of FIG. 3, is relatively hard and is not easily bent over a 45 degree arc having a radius of about ½ inch. In contrast, bones 10 or 30, log 20 and other products in accordance with the invention are easily bent over a 45° arc and can even be bent over a 90 degree arc (and even greater) having a ½ inch radius, even after being exposed to the air for a day, a week and even longer. Thus, as opposed to the relatively stiff, brittle feel of conventional rawhide products having less than 0.75 water activity without the presence of preservatives, a rawhide product in accordance with the invention can have a softness comparable to that of suede or leather, while maintaining a water activity below 0.75, without the use of preservatives.

Figure 4:
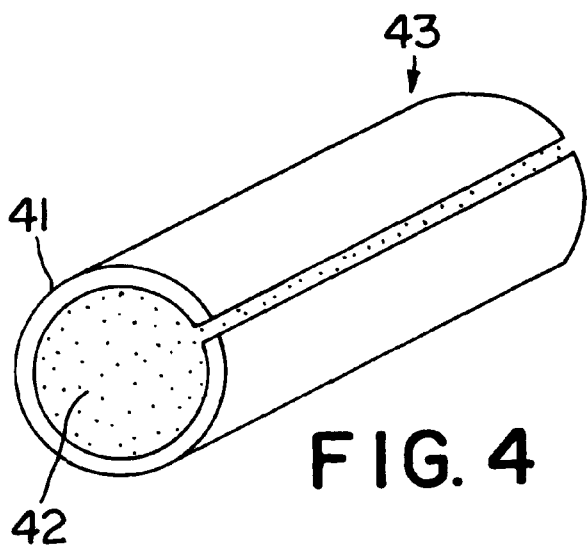
FIG. 4 is a soft rawhide chew toy having an outer portion formed from a sheet of soft or hard rawhide around an inner portion formed from soft chopped rawhide, in accordance with preferred embodiments of the invention.
Figure 5:
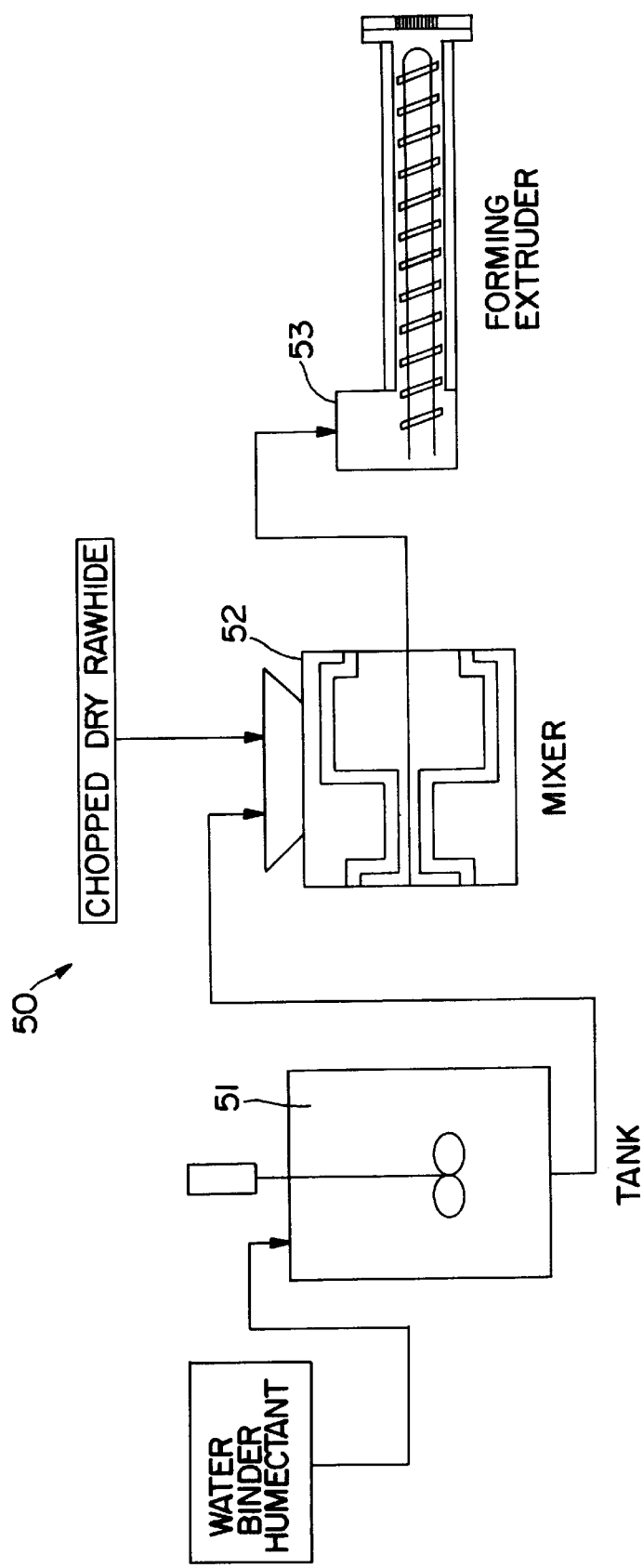
FIG. 5 is a schematic diagram of an apparatus for forming chopped rawhide products in accordance with embodiments of the invention.

In still another embodiment of the invention, as shown in FIG. 4, a sheet 41 of soft rawhide, hard rawhide or some other suitable edible material can be formed around a soft or hard chopped rawhide portion 42, to yield a combination edible chew toy 43.

The method of forming a soft rawhide product in accordance with the invention is also applicable to forming many types of soft untanned products from animal skins.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A rawhide product having a water activity of less than 0.85 and being substantially softer than a conventional rawhide product consisting essentially of rawhide and 15% or less moisture wherein said rawhide product is exposed to at least one humectant for at least one hour and wherein said rawhide product is treated with at least one antimicrobial agent.

2. The toy of claim 1, wherein the humectant comprises a sugar.

3. The rawhide product of claim 1 wherein said antimicrobial agent is selected from a group consisting of:
   a) an aqueous hydrogen peroxide solution;
   b) hydrogen peroxide;
   c) an aqueous citric acid solution; and
   d) and a saline solution.

4. A chew toy having a soft rawhide component, said soft rawhide component comprising rawhide, moisture and a humectant, said chew toy being edible to a dog or cat and having a water activity of below 0.85 wherein said soft rawhide component is treated with at least one antimicrobial agent.

5. The toy of claim 4, wherein the water activity is below about 0.75.

6. The toy of claim 5, wherein the humectant comprises at least one polyol.

7. The toy of claim 5 wherein the humectant comprises propylene glycol.

8. The toy of claim 5 wherein the humectant comprises glycerin.

9. The toy at claim 4, wherein the humectant comprises glycerin and propylene glycol.

10. The toy of claim 4, including a nutritional supplement or drug additive.

11. The toy of claim 4, including a flavor or scent additive.

12. The toy of claim 4, wherein the rawhide is in the form of chopped pieces having an average diameter less than about 0.25 inches.

13. The toy of claim 12, including an edible binder.

14. The toy of claim 4, including at least one flavor additive and at least one scent additive.

15. The toy of claim 4, including at least one nutritional supplement and at least one drug additive.

16. The rawhide chewtoy of claim 4 wherein said antimicrobial agent is selected from a group consisting of:
   a) an aqueous hydrogen peroxide solution;
   b) hydrogen peroxide;
   c) an aqueous citric acid solution; and
   d) and a saline solution.

17. A pet toy, comprising rawhide, having a water activity below about 0.85 being substantially lacking in preservatives, and being flexible enough after being exposed to air for about one week, to be bent in an arc of more than about 45 degrees having a radius of about 0.5 inches.

18. An animal skin product, comprising an untanned animal skin having a water activity of below 0.75, the skin being substantially free of preservatives and having a Young's modulus of less than ½ the Young's modulus of the pure version of the animal skin having a moisture content of 13%.

19. The product of claim 18, wherein the product has a Young's modulus less than 0.1 the Young's modulus of the pure version of the animal skin having 13% moisture or less.

20. A method of forming a rawhide product, comprising the steps of:
   soaking the untanned unpreserved hide of an animal in a liquid composition containing
   a humectant and drying the hide to a selected moisture content wherein said rawhide product is treated with at least one antimicrobial agent.

21. The method of claim 20, wherein the liquid composition includes propylene glycol.

22. The method of claim 21, including adding at least one flavor, scent, nutritional supplement or drug additive to the liquid composition.

23. The method of claim 20, wherein the liquid composition includes glycerin.

24. The method of claim 20, including the step of chopping the rawhide and adding a binder to the liquid composition, before the rawhide and liquid are combined.

25. The method of claim 20 wherein said antimicrobial agent is selected from a group consisting of:
   a) an aqueous hydrogen peroxide solution;
   b) hydrogen peroxide;
   c) an aqueous citric acid solution; and
   d) a saline solution.

26. A method of forming an edible rawhide chew toy of a selected shape, comprising:
   chopping rawhide into small pieces;
   forming a liquid composition by combining water, at least one edible humectant and an edible binder;
   sanitizing said edible rawhide chewtoy comprising exposing said edible rawhide chewtoy to at least one antimicrobial agent;
   combining the chopped rawhide and the liquid composition; and
   forming the combined chopped rawhide and liquid composition into a selected shape wherein said edible rawhide chewtoy is exposed to liquid composition for at least one hour.

27. The method of claim 26, wherein the humectant comprises at least one polyol.

28. The method of claim 26, wherein the liquid composition includes one or more of propylene glycol, glycerin, sorbitol or mannitol.

29. The method of claim 26, wherein the liquid composition includes gelatin.

30. The method of claim 26, wherein the combination of liquid composition and chopped rawhide comprises about 10–55% humectant, about 40–20% water, about 4–20% binder and about 25 to 65% chopped rawhide on a weight basis.

31. The method of claim 30, wherein the humectant comprises glycerin and the binder comprises gelatin.

32. The method of claim 26, wherein the combined rawhide and liquid composition are fed into an extruder to be formed into the selected shape.

33. The method of claim 26 wherein said antimicrobial agent is selected from a group consisting of:
   a) an aqueous hydrogen peroxide solution;
   b) hydrogen peroxide;
   c) an aqueous citric acid solution; and
   d) a saline solution.

34. An edible pet chew toy, comprising: chopped rawhide, at least one humectant, at least one edible binder said edible pet toy having a water activity below about 0.85 wherein said rawhide product is treated with at least one antimicrobial agent.

35. The toy of claim 34, wherein the water activity is below about 0.75.

36. The toy of claim 34, wherein the humectant comprises glycerin or propylene glycol and the binder comprises gelatin.

37. The toy of claim 34, wherein the humectant comprises glycerin and propylene glycol.

38. The toy of claim 34, wherein after being exposed on the air for one week, the toy is flexible enough to be bent in an arc of over 45 degrees having a radius of about 0.50 inches.

39. The toy of claim 34, formed by combining about 10–55% humectant, about 40–20% water, about 4–20% binder and about 25 to 65% chopped rawhide.

40. The toy of claim 34, comprising a portion formed of chopped rawhide, covered at least partially with a sheet of edible material.

41. The toy of claim 40, wherein the sheet comprises rawhide and a humectant and is substantially softer than a sheet consisting of dry rawhide.

42. The edible pet toy of claim 34 wherein said antimicrobial agent is selected from a group consisting of:
   a) an aqueous hydrogen peroxide solution;
   b) hydrogen peroxide;
   c) an aqueous citric acid solution; and
   d) and a saline solution.

* * * * *